US00RE39169E

(19) United States
(12) Reissued Patent
Kameyama et al.

(10) Patent Number: US RE39,169 E
(45) Date of Reissued Patent: Jul. 11, 2006

(54) INK RIBBON CARTRIDGE HAVING A PARTICULAR SPOOL AND SPINDLE ARRANGEMENT

(75) Inventors: Yoshikatsu Kameyama, Gifu-ken (JP); Hiroaki Yazawa, Nagoya (JP)

(73) Assignee: Brother Kogyo Kabushiki Kaisha, Nagoya (JP)

(21) Appl. No.: 10/323,062

(22) Filed: Dec. 19, 2002

Related U.S. Patent Documents

Reissue of:
(64) Patent No.: 6,161,972
Issued: Dec. 19, 2000
Appl. No.: 09/291,189
Filed: Apr. 14, 1999

(63) Continuation of application No. 08/990,732, filed on Dec. 15, 1997, now Pat. No. 5,913,621.

(30) Foreign Application Priority Data

Jan. 6, 1997 (JP) ..... 9-000217

(51) Int. Cl.
*B41J 32/00* (2006.01)
*B41J 35/28* (2006.01)

(52) U.S. Cl. ..... 400/208; 400/246
(58) Field of Classification Search ..... 400/208, 400/207, 208.1, 242, 246, 693.1
See application file for complete search history.

(56) References Cited

U.S. PATENT DOCUMENTS 4,160,605 A * 7/1979 Neubaum ..... 400/208
4,687,358 A 8/1987 Saitou ..... 400/208

(Continued)

FOREIGN PATENT DOCUMENTS

EP 0 435 108 A2 * 7/1991
EP 0 466 186 A3 1/1992

(Continued)

OTHER PUBLICATIONS

Japanese Instruction Manual for the Fuji Xerox 7021 Print Cartridge and translation of pertinent sections (Best known publication date: Apr. 1988). Photographs of the print cartridge to assist in understanding the instruction manual.*

(Continued)

*Primary Examiner*—Leslie J. Evanisko
(74) *Attorney, Agent, or Firm*—Oliff & Berridge, PLC

(57) ABSTRACT

The invention provides an ink ribbon cartridge which ensures proper, reliable mounting of an ink ribbon. The ink ribbon cartridge of the invention includes a pair of spools, an ink ribbon including a band-like sheet wound around the pair of spools and provided with a layer of ink formed on one surface thereof, four spindles which have disk-shaped sections at one end and can be placed, for a specific length in both ends of the pair of spools, and a cover covering the pair of spools around which the sheet is wound and having four round holes in which the disk-shaped sections of each of the spindles are loosely fitted. In one of the four ends of the pair of spools, only the other end of a specific one of the four spindles can be inserted for a specific length, and one of the four round holes formed in the cover is formed such that only the disk-shaped section on one side of the specific spindle can be loosely fitted.

25 Claims, 8 Drawing Sheets

U.S. PATENT DOCUMENTS

| | | | | | |
|---|---|---|---|---|---|
| 4,978,240 | A | * | 12/1990 | Katsuno | 400/246 |
| 5,100,250 | A | * | 3/1992 | Suzuki et al. | 400/208 |
| 5,110,228 | A | | 5/1992 | Yokomizo | 400/208 |
| 5,399,035 | A | * | 3/1995 | Nakae | 400/208 |
| 5,415,486 | A | | 5/1995 | Wouters et al. | 400/692 |
| 5,480,242 | A | * | 1/1996 | Gunderson | 400/208 |
| D383,743 | S | * | 9/1997 | Suwa et al. | D14/118 |
| 5,741,080 | A | | 4/1998 | Tomoda et al. | 400/208 |
| 5,800,084 | A | | 9/1998 | Sawada et al. | 400/208 |
| 5,897,256 | A | * | 4/1999 | Kameyama | 400/208 |

FOREIGN PATENT DOCUMENTS

| | | | |
|---|---|---|---|
| EP | 0 466 186 | A2 | 1/1992 |
| EP | 0 593 821 | A1 | 4/1994 |
| EP | 0 658 435 | A1 | 6/1995 |
| JP | 61-54969 | * | 3/1986 |
| JP | 61-222772 | * | 10/1986 |
| JP | 62-164150 | | 7/1987 |
| JP | 3-169578 | * | 7/1991 |
| JP | 05-069624 | | 3/1993 |
| JP | 05-270024 | | 10/1993 |
| JP | 5-270089 | * | 10/1993 |
| JP | 5-270098 | | 10/1993 |
| JP | 05-278284 | | 10/1993 |
| JP | 06-155877 | | 6/1994 |
| JP | 07-032693 | | 2/1995 |
| JP | 07-214877 | * | 8/1995 |
| JP | 08-058199 | | 3/1996 |

OTHER PUBLICATIONS

Japanese Instruction for the Fuji Xerox 7024 Print Cartridge and translation of pertinent sections (Best known publication date: Aug. 1991). Photographs of the print cartridge to assist in understanding the instruction manual.*

Japanese Instruction Manual for the Canon A501 Print Cartridge and translation of pertinent sections (Best known publication date: 1990). Photographs of the print cartridge to assist in understanding the instruction manual.*

Japanese Instruction Manual for the Hitachi HF3A5A Print Cartridge and translation of pertinent sections (Best known publication date: 1993). Photographs of the print cartridge to assist in understanding the instruction manual.*

Japanese Instruction Manual for the Sharp UX–15CR Replacement Ribbon and translations of pertinent sections (Best known publication date: unknown). Photographs of the print cartridge to assist in understanding the instruction manual.*

Instruction Manual and Fact Sheet for the Panasonic KX–FA132 Print Cartridge (Best known publication and use date: Sep. 1995). Photographs of the print cartridge to assist inunderstanding the instruction manual.*

* cited by examiner

INK RIBBON CARTRIDGE HAVING A PARTICULAR SPOOL AND SPINDLE ARRANGEMENT

Matter enclosed in heavy brackets [ ] appears in the original patent but forms no part of this reissue specification; matter printed in italics indicates the additions made by reissue.

This is a Continuation of application Ser. No. 08/990,732 filed Dec. 15, 1997, now U.S. Pat. No. 5,913,621 issued Jun. 22, 1999. The entire disclosure of the prior application is hereby incorporated by reference herein in its entirety.

BACKGROUND OF THE INVENTION

1. Field of Invention

The present invention relates to an ink ribbon cartridge containing a replaceable wide ink ribbon.

2. Description of Related Art

Generally an ink ribbon cartridge is used because of its simplicity of handling when a thermal printer is used to print on common printing paper. However, when a thermal printer (e.g., a line printer) uses a large ink ribbon cartridge, it becomes uneconomical if the whole cartridge thrown away after use. To obviate this drawback, the ink ribbon alone is replaced.

For this type of ink ribbon, there is employed an ink ribbon including a band-like sheet comprising a resin film with a layer of ink formed on one side of the ribbon and wound around a pair of paper spools. A prior art ink ribbon cartridge using this type of ink ribbon was constructed such that, at the time of ink ribbon replacement, the cover is opened, the used ink ribbon is taken out, and four spindles inserted in both ends of a pair of paper spools of the ink ribbon are removed and then placed in both ends of one pair of paper spools of a new ink ribbon. After the insertion of the new ink ribbon into the cover, the cover is closed. Subsequently, the ink ribbon cartridge is mounted in a printer or a facsimile system as supported by a spindle on bearings that transmit the torque to the paper spools through the spindles, thereby winding the sheet around the paper spool.

However, the above-described prior art ink ribbon cartridge is of such a structure that any one of the four spindles can be inserted into either of both ends of a pair of paper spools. In addition, in any combination of spindles and spools, the ink ribbon is inserted into the cover to allow the cover to close. Therefore, failures in printing due to improper mounting of the ink ribbon often occurred.

That is, since a layer of ink is formed on one side of the sheet, the ink cannot be transferred to a recording paper if the sheet is mounted with the wrong side out. Also, if the direction of winding is reversed, the sheet can not be wound up, resulting in a failure in printing.

SUMMARY OF THE INVENTION

In view of the above-described problem, therefore, it is an object of the invention to provide an ink ribbon cartridge capable of reliably preventing the improper mounting of an ink ribbon.

In order to accomplish the above-described object, the ink ribbon cartridge of the invention has a pair of spools, an ink ribbon including a band-like sheet wound around the pair of spools and provided with a layer of ink formed on one surface thereof, four spindles which have disk-shaped sections at one end and can be placed, for a specific length of the other end, in both ends of the pair of spools, and a cover covering the pair of spools around which the sheet is wound and having four round holes in which the disk-shaped sections of each of the spindles are loosely fitted.

The other end of a specific one of the four spindles can not be placed for the specific length in three of the four ends of the pair of spools. In addition, three of the four round holes formed in the cover are made such that the disk-shaped section on one side of the specific spindle can not be loosely fitted.

According to the ink ribbon cartridge of the invention, since the other end of the specific one of four spindles can not fit for a specific length in three of the four ends of a pair of spools, the other end of a spool in which one side of the specific spindle can be placed will be unequivocally determined. In addition, since the disk-shaped section on one side of the specific spindle can not be fitted in three of the four round holes formed in the cover, the round hole in which the disk-shaped section of the specific spindle can be loosely fitted will also be unequivocally determined. Consequently, both the mounting and winding directions of the covered sheet will be unequivocally determined, thereby reliably preventing improper mounting of the ink ribbon.

To make is impossible to fit the other end of the specific one of four spindles for a specific length into any one of three of the four ends of a pair of spools, it is sufficient to provide a slot in the axial direction in the end face of the spool and a projection on the spindle which is placed in this slot, and also to provide a longer slot in one end face of a spool on one side and a longer projection on the spindle on one side than the other.

To make it impossible to loosely fit one side of the disk-shaped section of the specific spindle in three of four round holes formed in the cover, it is necessary to provide, for instance, a larger-diameter disk-shaped section of the specific spindle than the disk-shaped section of the other spindles and also to increase the diameter of one of the four round holes formed in the cover than that of the outer round holes.

Furthermore, according to another embodiment of the ink ribbon cartridge of the invention, the ink ribbon cartridge has an ink ribbon including a pair of spools and a band-like sheet wound around a pair of spools and provided with a layer of ink formed on one side thereof, four spindles which have a disk-shaped section at one end and can be placed, for a specific length of the other end, in the ends of the pair of spools; and a cover covering the pair of spools around which the sheet is wound, and having four round holes in which the disk-shaped section of each of the spindles is loosely fitted. In the ink ribbon cartridge, only a specific one of the four spindles can fit for the specific length in one of the four ends of the pair of spools; and one of the four round holes formed in the cover is made such that the disk-shaped section of the specific spindle can be loosely fitted therein.

According to the ink ribbon cartridge of the invention, only the other end of the specific one of four spindles can be placed for a specific length in one of the four ends of a pair of spools; therefore, the other end of the specific one of the four spindles is unequivocally determined. In addition, since only the disk-shaped section on one side of the specific spindle can fit in one of the four round holes formed in the cover, the round hole on the side in which the specific one of the specific spindle can fit is also unequivocally determined. Therefore, the mounting and winding directions of the sheet within the cover are unequivocally determined, thus reliably preventing defective mounting of the ink ribbon.

To make it possible to fit the other end of the specific one of four spindles for a specific length into only one of the four ends of a pair of spools, it is sufficient to provide a slot in the axial direction in the end face of the spool and a projection on the spindle which is placed in this slot, and also to provide a shorter slot in one end face on one side of a spool and a shorter projection on one of the spindles than the others.

To make it possible to loosely fit only the disk-shaped section on one side of the specific spindle in one of four round holes formed in the cover, it is necessary to provide, for instance, a smaller-diameter disk-shaped section on one side of specific the spindle than the disk-shaped section of the other spindles and also to decrease the diameter of one of the four round holes formed in the cover than that of the other round holes.

Furthermore, another embodiment of the ink ribbon cartridge of the invention is similar to the ink ribbon cartridge discussed above, however two slots are formed in the circular end face of each of the four ends of a pair of spools. The four spindles are each provided with two projections which can fit in a couple of slots in the spool. These two projections are provided on a specific one of the four spindles and are arranged at an angle different from other three spindles, with respect to the axial center of the specific spindle. The two slots formed in the end face of one of the four ends of the spools are arranged at an angle different from the other three ends with respect to the center of the end face, so that two projections provided on a specific spindle can be placed in the two slots.

The ink ribbon cartridge may be structured such that because of the relationship of placing the projection of the spindle in the slot of the spool, the specific one of the four spindles can not fit for a specific length in three of the four ends of a pair of spools so that only the other end of a specific one of the four spindles can fit for a specific length in a specific one of the four ends of the pair of spools. Furthermore, since the slots are formed in the spool body, the spool can be more easily be manufactured as compared with a spool which is provided with projections on the inner peripheral surface thereof.

Furthermore, another embodiment of the ink ribbon cartridge of the invention is the ink ribbon cartridge as discussed above, however, with two of the four spindles having a gear section formed to rotate the spool on the axis. Because a gear section is formed on two spindles, the sheet can be taken up by turning the two spindles inserted in one end of the pair of spools. Therefore, it is possible to decrease the length in the direction of the axis of the spool by the same amount as the width of the gear section as compared with a cartridge having the gear section formed on each of the four spindles.

Furthermore, another embodiment of the ink ribbon cartridge of the invention is in the ink ribbon cartridge stated above and further structured such that a round hole will be opened when the cover is in a closed state; the gear section is larger in diameter than the disk-shaped section and is positioned on the other end of the spindle; and when the end of the spindle on which the gear section is formed is inserted for a specific length in the wrong end of one of a pair of spools, the gear section of the spindle is positioned in the round hole in the cover, so that the cover will not close.

The ink ribbon cartridge of the invention has the following advantage, in that when the other end of the spindle on which the gear section is formed is placed for a specific length in either end of one of the pair of spools, the cover will not close because the gear section is positioned in the round hole of the cover, thereby preventing defective installation, that is, the placement of two spindles with the gear section into the same spool on one side of the cartridge.

Furthermore, another embodiment of the ink ribbon cartridge of the invention is instructed such that the cover has two gear cover sections in which a gear section formed on either of the two spindles is loosely fitted, and can be opened and closed so that the gear cover section may be formed when the cover is closed; on the four spindles are formed disk-shaped collar sections which are larger in diameter than the inside diameter of the gear cover section of the cover; and when the spindle with the gear section and the spindle without the gear section are placed in mutually opposite positions in both ends of one of the pair of spools, and the collar section on the spindle without the gear section is positioned in the gear cover section of the cover, the cover will not close.

The ink ribbon cartridge has the following advantage, in that when the spindle with the gear section and the spindle without the gear section are positioned in mutually opposite directions in both ends of one of the pair of spools, the collar section of the spindle without the gear section is positioned in the gear cover section of the cover to thereby prevent the cover from closing. It is, therefore, possible to prevent improper mounting of the spindle with the gear section and the spindle without the gear section on one specific side of a spool.

Furthermore, another embodiment of the ink ribbon cartridge of the invention is structured such that, in the cover are formed two gear cover sections in which the gear sections formed on two spindles are loosely fitted; the cover operating so that the gear cover section will be formed when the cover is closed; on each of the four spindles is formed a disk-shaped collar section which is larger in diameter than the inside diameter of the gear cover section of the cover, so that when the spindle with the gear section is placed in either end of one of the pair of spools, the collar section of one of the two spindles is positioned in the gear cover section of the cover to prevent the cover from closing.

The ink ribbon cartridge has the advantage that when the spindle with the gear section is positioned in both ends of one of the pair of spools, the collar section of one of the two spindles is positioned in the gear cover section of the cover to prevent the cover from closing. It is, therefore, possible to prevent improper mounting, that is, fitting of two spindles with the gear section into the same spool.

According to the ink ribbon cartridge as explained above, since the other end of the specific one of four spindles can not fit for a specific length in three of four ends of a pair of spools, the other end of a spool in which one side of the specific spindle can be placed will be unequivocally determined; and also since the disk-shaped section on one side of the specific spindle can not be placed in three of the four round holes formed in the cover, the round hole in the cover in which one side of the specific spindle can be loosely fitted will also be unequivocally determined. Consequently, both the mounting and winding directions of the sheet in the cover will be unequivocally determined, thereby reliably preventing improper mounting of the ink ribbon.

Also according to the ink ribbon cartridge of the invention, only the other end of the specific one of four spindles can be fitted for a specific length in one of the four ends of a pair of spools; therefore the other end of the specific one of the four spindles is unequivocally determined. In addition, since only the disk-shaped section on one side of the specific spindle can fit in one of the four round holes formed in the cover, the round hole in the cover in which one side of the specific one of the spindles can fit is also unequivocally determined. Consequently, the mounting and winding direction of the sheet within the cover are unequivocally determined, thus reliably preventing defective mounting of the ink ribbon.

Furthermore, according to the ink ribbon cartridge of the invention, the ink ribbon cartridge may be structured such that, because of the relationship between fitting the projections of the spindle in the slots of the spool, the other end of the specific one of the four spindles can not fit for a specific length in three of the four ends of a pair of spools and only the other end of a specific one of the four spindles can fit for a specific length in one of the four ends of the pair of spools. Furthermore, since slots are formed in the spool body, the spool can be more easily manufactured as compared with a spool which is provided with projections on the inner peripheral surface thereof.

According to the ink ribbon cartridge of the invention, because a gear section is formed on two spindles the sheet can be taken up by turning a pair of spools with these two spindles inserted in one end of the pair of spools. Therefore, it is possible to decrease the length of the ink ribbon cartridge in the direction of the axis of the spool by the same amount as the width of the gear section as compared with a case where the gear section is formed on each of the four spindles.

Furthermore, the ink ribbon cartridge has the advantage that when the other end of the spindle on which the gear section is formed is placed for a specific length in the wrong end of either one of the pair of spools, the cover will not close because the gear section on one side of the spindle is positioned in the round hole of the cover, thereby preventing defective installation, that is, fitting of two spindles with gear sections into the same spool on one side of the ink ribbon cartridge.

Furthermore, the ink ribbon cartridge has the advantage that when the spindle with the gear section and the spindle without the gear section are positioned in mutually opposite directions in both ends of one of the pair of spools, when the collar section of the spindle without the gear section is positioned in the gear cover section of the cover, the cover is prevented from closing. It is, therefore, possible to prevent improper mounting of the spindle with the gear section and the spindle without the gear section in a spool on one side of the ink ribbon cartridge.

Furthermore, the ink ribbon cartridge of the invention has the following advantage, that when spindles with gear sections are positioned in both ends of one of the pair of spools, the collar section of the other one of the two spindles is positioned in the gear cover section of the cover on the other side of the cartridge to prevent the cover from closing. It is, therefore, possible to prevent improper mounting, that is, fitting two spindles with the gear section into the spool on one side of the ink ribbon cartridge.

DETAILED DESCRIPTION OF PREFERRED EMBODIMENTS

Hereinafter preferred embodiments of a recording apparatus according to the invention will be particularly explained with reference to the accompanying drawings.

Figure 1:
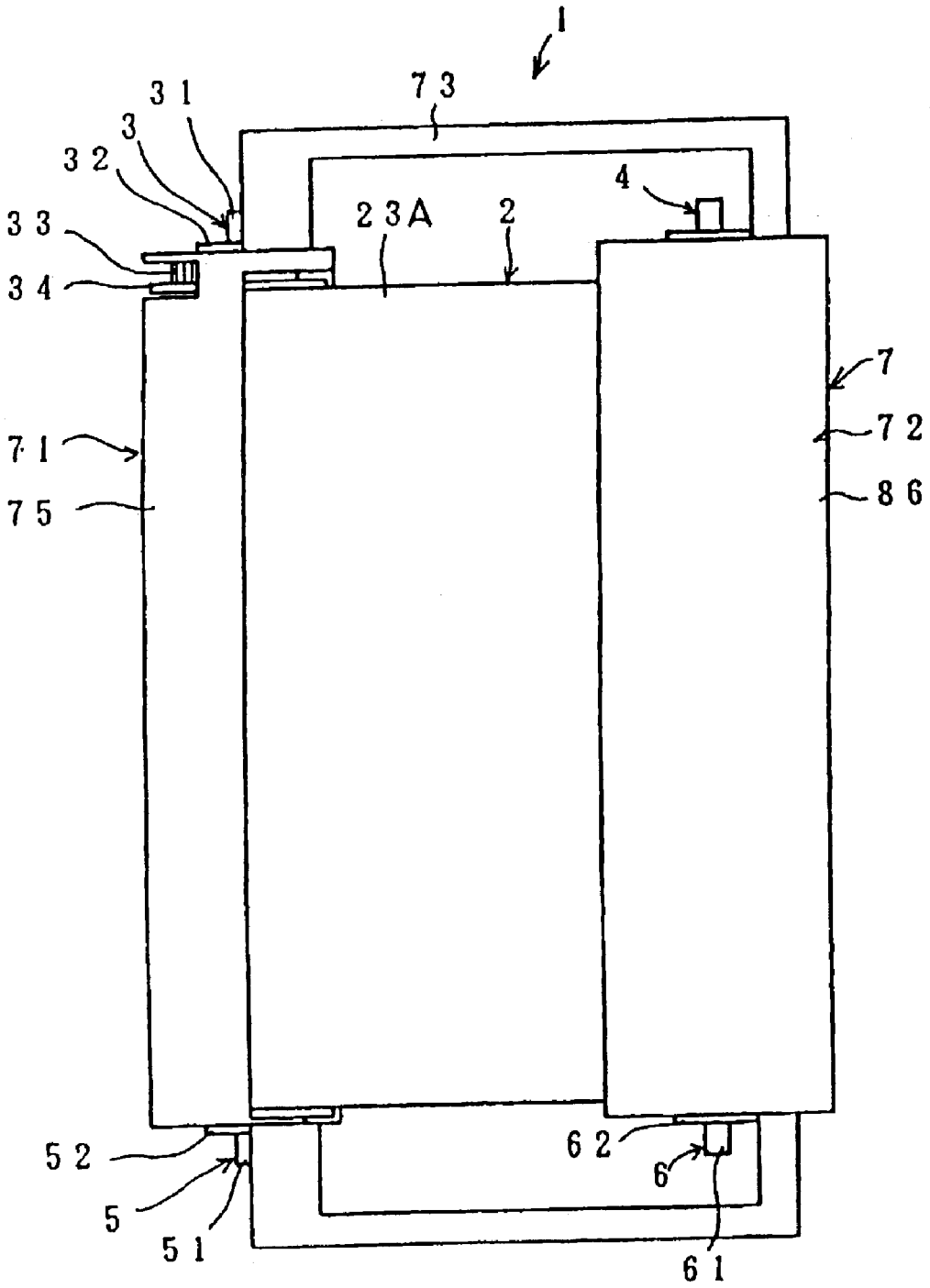
FIG. 1 is a plan view of an ink ribbon cartridge according to the invention.
Figure 2:
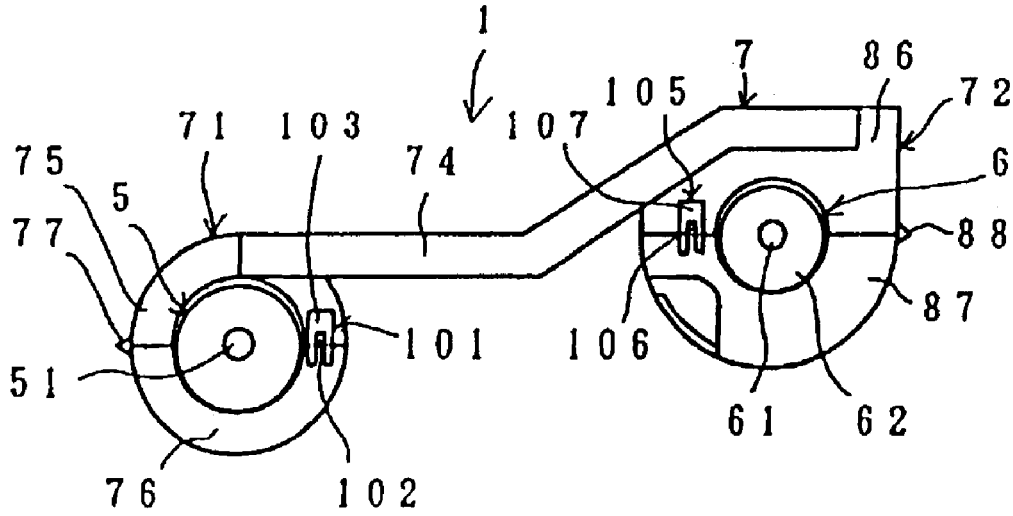
FIG. 2 is a front view of the ink ribbon cartridge shown in FIG. 1.
Figure 3:
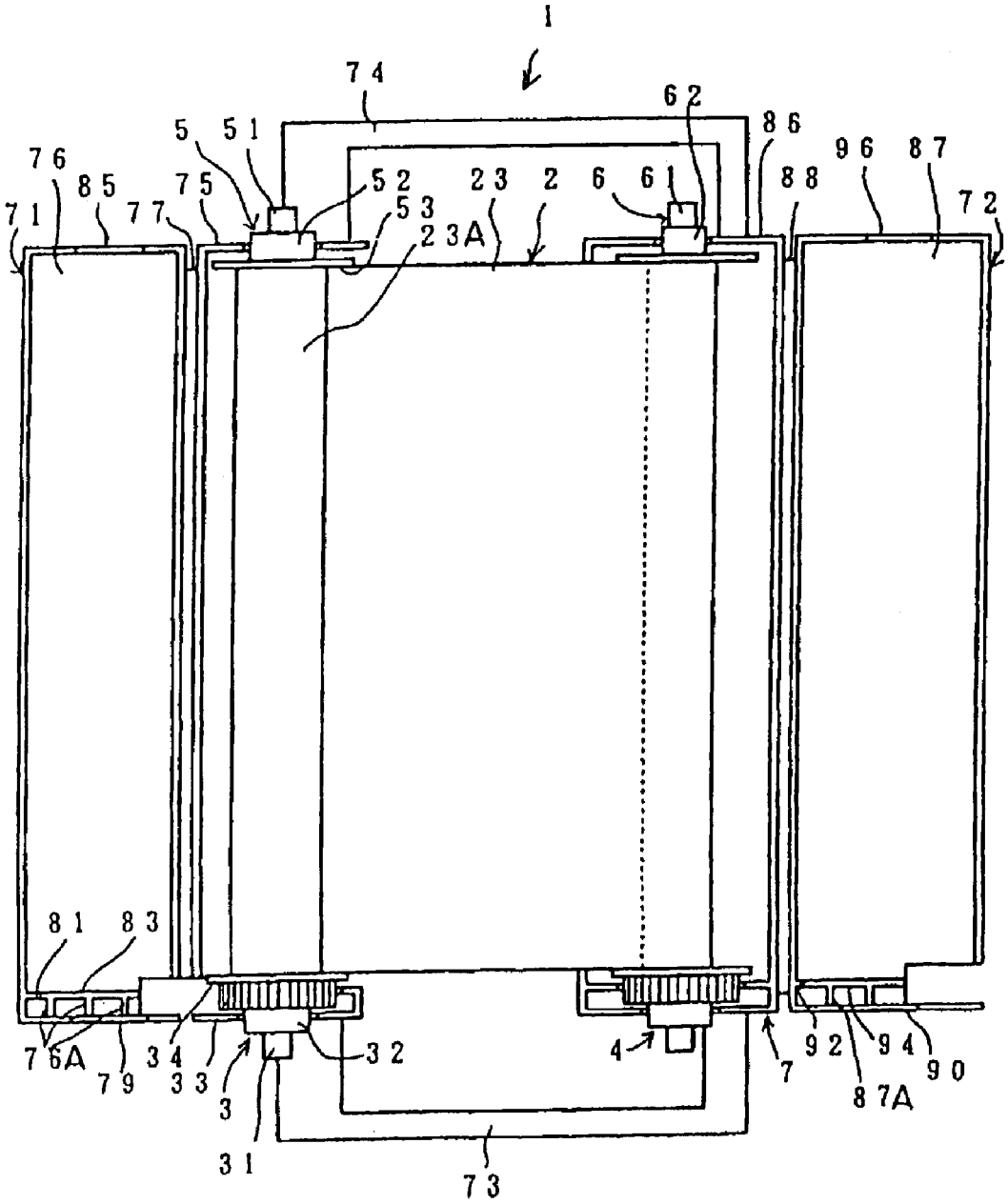
FIG. 3 is a bottom view of the ink ribbon cartridge shown in FIG. 1 in an opened position.

First, the ink ribbon cartridge for use in a recording apparatus will be explained. FIG. 1 is a plan view of the ink ribbon cartridge according to the invention; FIG. 2 is a front view of the same; and FIG. 3 is a bottom view thereof. In FIG. 3, the cover is in an opened position.

Figure 4:
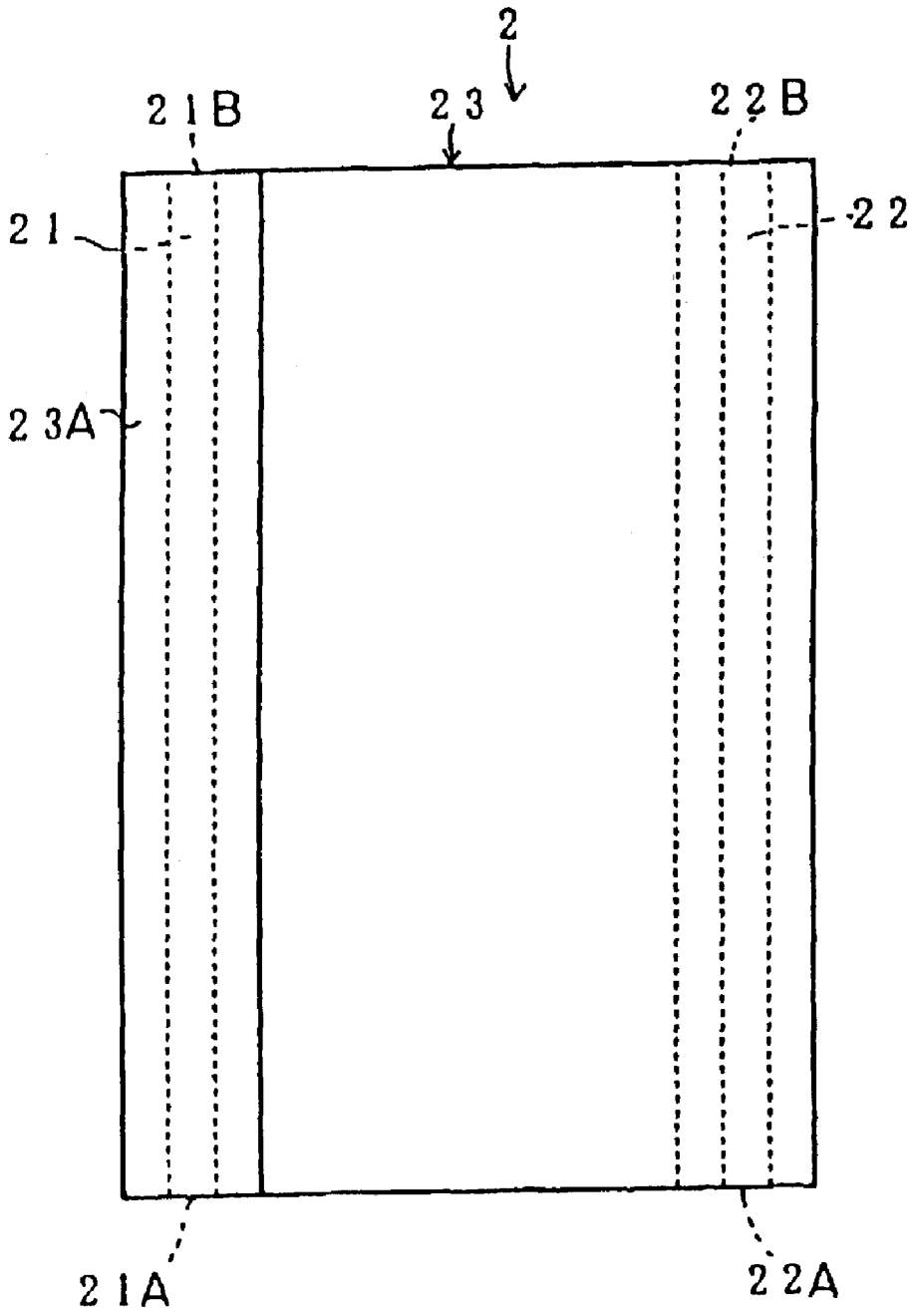
FIG. 4 is a bottom view of an ink ribbon mounted in the ink ribbon cartridge shown in FIG. 1.
Figure 5:
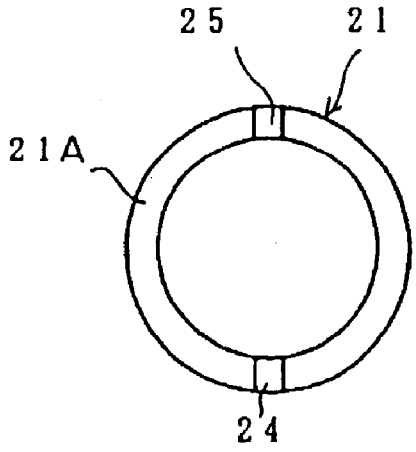
FIG. 5 is a front view of a spool provided in the ink ribbon cartridge shown in FIG. 1.
Figure 6:
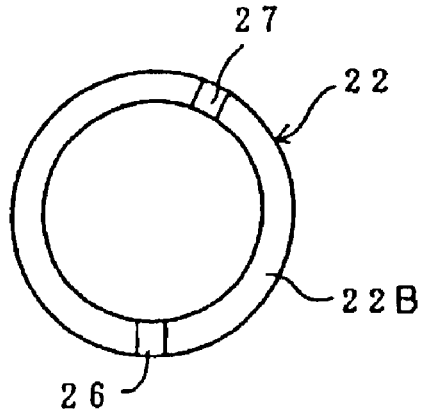
FIG. 6 is a front view of another spool provided in the ink ribbon cartridge shown in FIG. 1.

The ink ribbon cartridge 1 is made up of an ink ribbon 2, four spindles 3 to 6, and a cover 7. The ink ribbon 2, as shown in FIG. 4, comprises a pair of paper spools 21 and 22, and a band-like sheet 23 wound on these spools 21 and 22. The spool 21 and the spool 22 are of the same shape and size and are cylindrical in shape. The sheet 23 has a ink layer 23A formed on one side of the entire surface of, for instance a resin film. With the sheet 23 inserted between the recording surface of a thermal print head of a thermal printer (e.g., a line printer) and the recording paper, the current is supplied to the heating element of the thermal print head in accordance with the image data, thereby forming image line after image line on the recording paper. At this time, the recording paper is positioned on the ink layer 23A side. On one end face 21A of the spool 21, as shown in FIG. 5, slots 24 and 25 of specific depth are formed in a radial direction. These slots 24 and 25 are arranged at an interval of 180 degrees around the center of the axis of the spool 21. There are also formed slots similar to the slots 24 and 25 in the other end face 21B of the spool 21 and in one end face 22A of the spool 22. In the other end face 22B of the spool 22, as shown in FIG. 6, slots 26 and 27 of specific depth are formed in the radial direction. These slots 26 and 27 are arranged at an interval of 150 degrees around the center of the axis of the spool 22.

Figure 7:
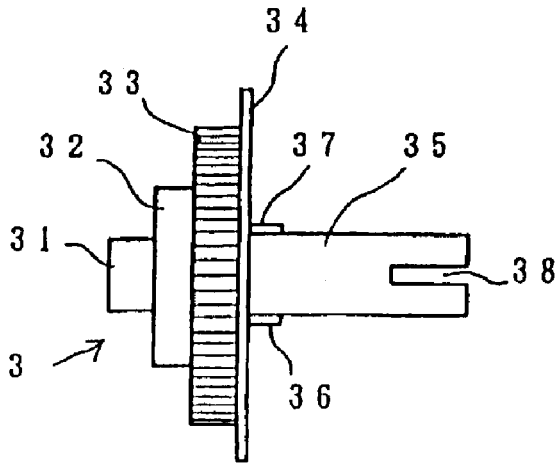
FIG. 7 is a front view of a spindle provided in the ink ribbon cartridge shown in FIG. 1.
Figure 8:
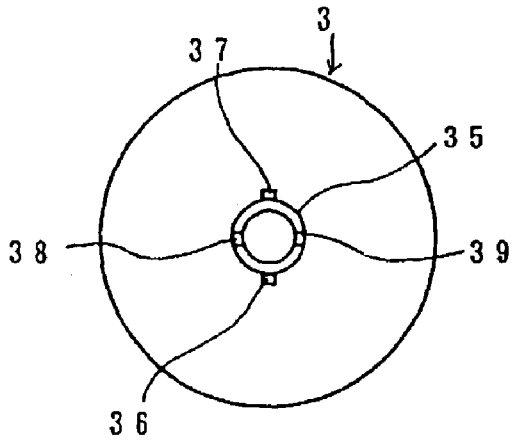
FIG. 8 is a side view of the spindle shown in FIG. 7.

The spindle 3 is unitarily molded of for instance a resin, and, as shown in FIGS. 7 and 8, consists of a small-diameter portion 31, a disk-shaped section 32, a gear section 33, a disk-shaped collar section 34, and a spindle portion 35, which are arranged in the order of mention from one end of the spindle to the other. The disk-shaped section 32 measures larger in diameter than the small-diameter portion 31 and the spindle portion 35; the gear section 33 is larger in diameter than the disk-shaped section 32; and the collar section 34 has a larger diameter than the gear section 33. On the outer peripheral surface of one end of the spindle portion 35 are provided projections 36 and 37, which are arranged 180 degrees apart from each other around the center of the axis of the spindle portion 35. These projections 36 and 37 fit in the slots 24 and 25 in one end face 21A of the spool 21 when the spindle portion 35 of the spindle 3 is placed in one end of the spool 21. In the other end of the spindle portion 35 are formed slots 38 and 39. The spindle 4 is also of the same structure, shape and size as the spindle 3.

Figure 9:
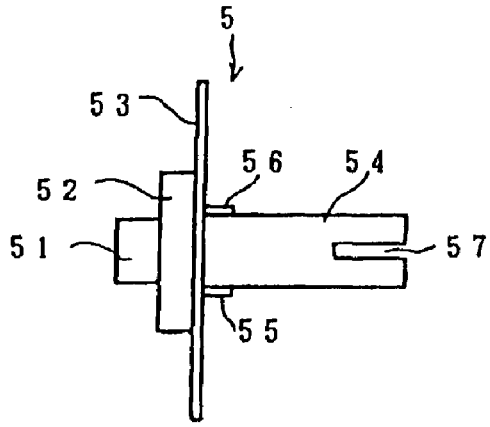
FIG. 9 is a front view of another spindle provided in the ink ribbon cartridge shown in FIG. 1.
Figure 10:
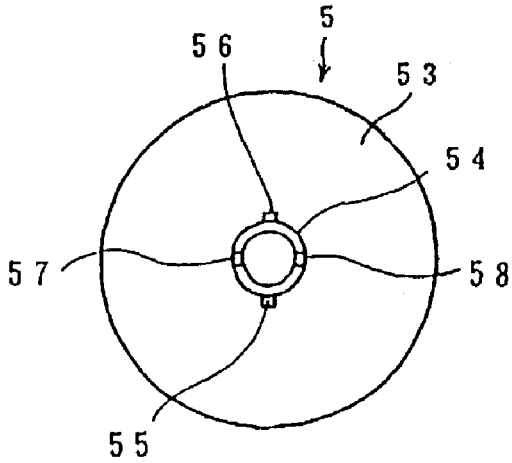
FIG. 10 is a side view of the spindle shown in FIG. 9.

The spindle 5 is unitarily molded of, for instance, a resin and, as shown in FIGS. 9 and 10, consists of a small-diameter portion 51, a disk-shaped section 52, a disk-shaped collar section 53, and spindle portion 54, which are arranged in the order of mention from one end of the spindle to the other. The disk-shaped section 52 is larger in diameter than the small-diameter portion 51 and the spindle portion 54, and the collar section 53 measures larger in diameter than the disk-shaped section 52. On the outer peripheral surface of one end portion of the spindle portion 54 are provided projections 55 and 56, which are arranged 180 degrees apart from each other around the center of the axis of the spindle portion 54. These projections 55 and 56 fit in slots in the other end face 21B of the spool 21 when the spindle portion 54 of the spindle 5 is placed in the other end of the spool 21. In the other end of the spindle portion 54 are formed slots 57 and 58. The spindle 5 is of the same shape and size as the spindle 3 including the disk-shaped section 32 and the collar section 34 but does not include the gear section 33.

Figure 11:
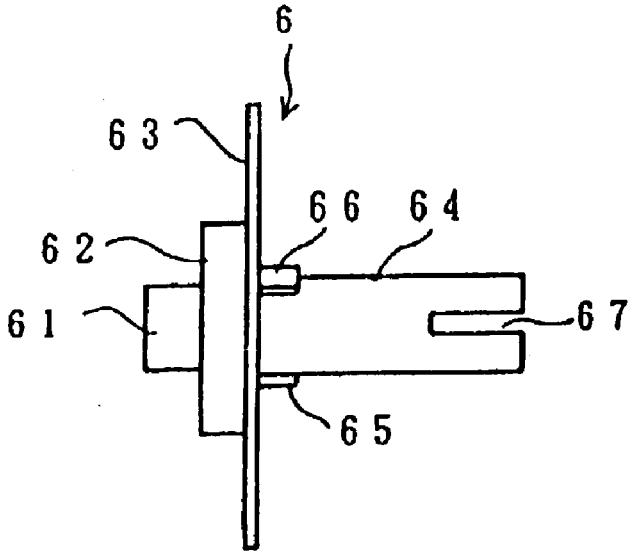
FIG. 11 is a front view of another spindle provided in the ink ribbon cartridge shown in FIG. 1.
Figure 12:
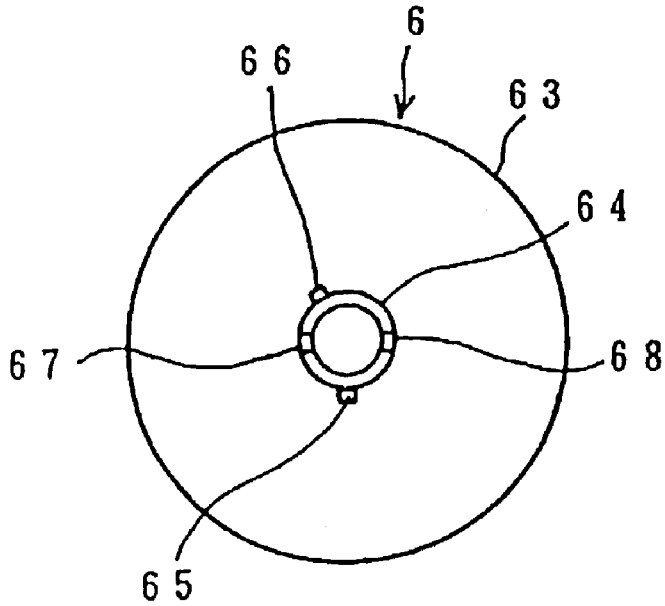
FIG. 12 is a side view of the spindle shown in FIG. 11.

The spindle 6 is unitarily molded of for instance, a resin, and, as shown in FIGS. 11 and 12, comprises a small-diameter portion 61, a disk-shaped section 62, a disk-shaped collar section 63, and a spindle portion 64, which are arranged in the order of mention from one end of the spindle towards the other. The disk-shaped section 62 has a larger diameter than the small-diameter portion 61 and the spindle portion 64, and the collar section 63 has a larger diameter than the disk-shaped section 62. On the outer peripheral surface of one end of the spindle portion 64 are projections 65 and 66, which are arranged 150 degrees apart from each other around the center of the axis of the spindle portion 64. These projections 65 and 66 fit in the slots 26 and 27 of the other end face 22B of the spool 22 when the spindle portion 64 of the spindle 6 is placed in the other end of the spool 22. In the other end of the spool portion 64 are formed slots 67 and 68. The spindle 6 is a little smaller than the disk-shaped section 52 of the spindle 5 but is of the same shape and size. However, the spindle 6 includes the projection 66 disposed 30 degrees closer to the projection 65.

Figure 13:
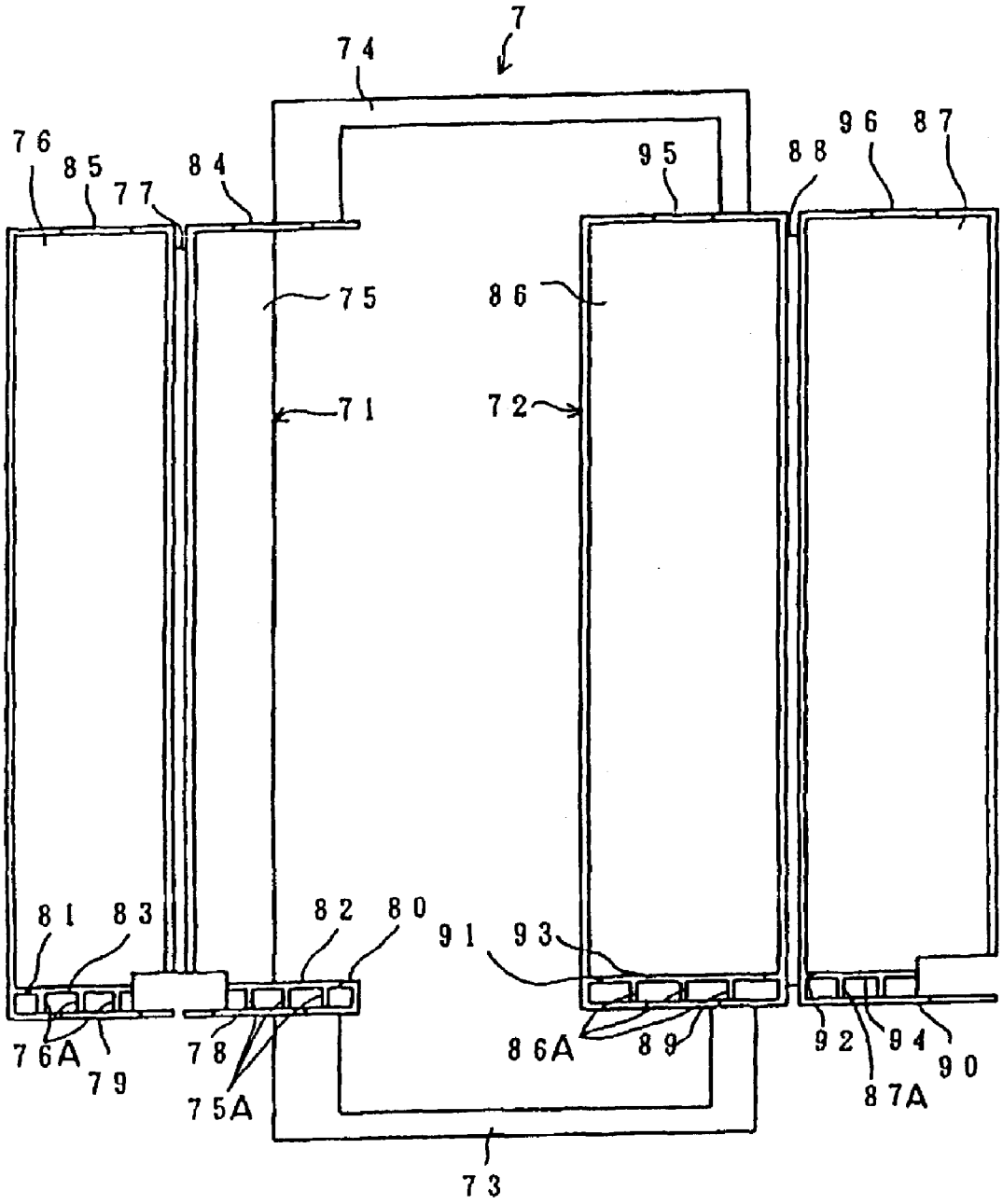
FIG. 13 is a bottom view of a cover in an opened position provided in the ink ribbon cartridge shown in FIG. 1.

The cover 7 is unitarily molded of, for example, a resin, and comprises, as shown in FIG. 13, a first cylindrical section 71, a second cylindrical section 72, and connection sections 73 and 74. The first cylindrical section 71 and the second cylindrical section 72 are connected by the connecting sections 73 and 74. The first cylindrical section 71 consists of an upper half section 75, a lower half section 76, and a connecting section 77. The lower half section 76 is rotatable on the center of the connecting section 77. In one end wall of the upper half section 75 and the lower half section 76 are formed semi-circular recesses 78 and 79. A round hole is formed by the recesses 78 and 79 when the lower half section 76 is closed. The round hole formed by the recesses 78 and 79 is larger in diameter than the disk-shaped section 32 of the spindle 3 and smaller in diameter than the gear section 33. In the vicinity of one end of the upper half section 75 and the lower half section 76 are formed partition walls 80 and 81. In these partition walls 80 and 81 are formed semi-circular recesses 82 and 83. When the lower half section 76 is closed, a round hole is formed by the recesses 82 and 83. The round hole has a larger diameter than the gear section 33 of the spindle 3 and has a smaller diameter than the collar section 34. Between the one end wall of the upper half section 75 and the lower half section 76 and the partition walls 80 and 81, a plurality of ribs 75A and 76A protrude on the inner peripheral surface of the upper half section 75 and the lower half section 76. The projecting ends of these ribs 75A and 76A are flush with the end wall of the recesses 82 and 83 formed in the partition walls 80 and 81. A space between the one end wall of the upper half section 75 and the lower half section 76 and the partition walls 80 and 81 is nearly equal to the width of the gear section 33, and the gear cover section covering the gear section 33 is formed by the one end wall of the upper half section 75 and the lower half section 75, the partition walls 80 and 81, and the ribs 75A and 76A.

In the other end wall of the upper half section 75 and the lower half section 76 are formed semi-circular recesses 84 and 85. When the lower half section 76 is in a closed position, a round hole is formed by the recesses 84 and 85. The round hole made by the recesses 84 and 85 is larger in diameter than the disk-shaped section 52 of the spindle 5 and smaller in diameter than the collar section 53.

The second cylindrical section 72 consists of an upper half section 86, a lower half section 87, and a connecting section 88. The lower half section 87 is rotatable from the center of the connecting section 88. In one end wall of the upper half section 86 and the lower half section 87 are formed semi-circular recesses 89 and 90. When the lower half section 87 is in a closed position, a round hole is formed by the recesses 89 and 90. The round hole formed by the recesses 89 and 90 has a larger diameter than the disk-shaped section of the spindle 4 and a smaller diameter than the gear section 33. In the vicinity of one end of the upper half section 86 and the lower half section 87 are formed partition walls 91 and 92. In these partition walls 91 and 92 are formed semi-circular recesses 93 and 94. When the lower half section 87 is in a closed position, a round hole is formed by the recesses 93 and 94. The round hole measures larger in diameter than the gear section of the spindle 4 and smaller than the collar section. Between the one end wall of the upper half section 86 and the lower half section 87 and the partition walls 91 and 92, a plurality of ribs 86A and 87A protrude on the inner peripheral surface of the upper half section 86 and the lower half section 87. The protruding ends of these ribs 86A and 87A are flush with the end walls of the recesses 93 and 94 formed in the partition walls 91 and 92. A space between the one end wall of the upper half section 86 and the lower half section 87 is nearly equal to the width of the gear section of the spindle 4. Thus, the gear cover section covering the gear section of the spindle 4 is formed by the one end walls of the upper half section 86 and the lower half section 86, the partition walls 91 and 92, and the ribs 86A and 87A.

In the other end walls of the upper half section 86 and the lower half section 87 are formed semi-circular recesses 95 and 96. When the lower half section 87 is in a closed position, a round hole is formed by the recesses 95 and 96. The round hole formed by the recesses 95 and 96, measures larger in diameter than the disk-shaped section 62 of the spindle 6, and is smaller in diameter than each of the collar section 63, the round hole formed by the recesses 78 and 79, the round hole formed by the recesses 84 and 85, and the round hole formed by the recesses 89 and 90.

On the other end of the first cylindrical section 71 is provided a locking member 101 for locking and releasing the lower half section 76 with the upper half section 75, as shown in FIG. 2. The locking member 101 comprises a projection 102 that protrudes from the other end of the upper half section 75 and a locking section 103 that protrudes from the other end face of the lower half section 76. The locking section 103 is secured at the lower end to the other end face of the lower half section 76, and bends toward the upper half section 75 to engage the projection 102. When the projection 102 fits in the hole formed nearly at center, the projection 102 engages with the locking section 103, thus locking the lower half section 76 to the upper half section 75. On one end face of the first cylindrical section 71 there is also provided a locking member similar to the locking member 101.

On the other end of the second cylindrical section 72 is provided a locking member 105 for locking and releasing the lower half section 87 to the upper half section 86 as shown in FIG. 2. The locking member 105 consists of a projection 106 that protrudes from the other end face of the upper half section 86, and a locking member 107 that protrudes from the other end face of the lower half section 87. The locking section 107 is secured at the lower end to the other end face of the lower half section 87, and bends toward the upper half section 86 to engage the projection 106. When the projection 106 fits in the hole formed nearly at center, the projection 106 is engaged with the locking section 107, thus locking the lower half section 87 to the upper half section 86. On one end face of the second cylindrical section 72 there is also provided a locking member similar to the locking member 105.

FIG. 3 shows the ink ribbon cartridge properly mounted with the spools 21 and 22 of the ink ribbon 2 and with the spindles 3 to 6 inserted in the spools when mounted in the cover 7. That is, the axial movement of the spool 21 is restricted by contact between the collar section 34 of the spindle 3 and the partition walls 80 and 81 of the upper half section 75 and the lower half section 76 of the first cylindrical section 71, and also by contact between the collar section 53 of the spindle 5 and the other end walls of the upper half section 75 and the lower half section 76 of the first cylindrical section 71. The axial movement of the spool 22 is restricted by contact between the collar section of the spindle 4 and the partition walls 91 and 92 of the upper half section 86 and the lower half section 87 of the second cylindrical section 72. The spool 22 and the spindles 4 and 6 make up a take-up spindle for taking up the sheet 23, and the spool 21 and the spindles 3 and 5 make up a feed spindle for feeding the sheet 23.

To replace a used ink ribbon 2, the cover 7 is opened as shown in FIG. 3, the used ink ribbon 2 is taken out, the spindles 3 to 6 are removed from the spools 21 and 22 of the used ink ribbon 2, and then the spindles 3 to 6 are installed to the spools 21 and 22 of the new ink ribbon 2. That is, the spindle portion 35 of the spindle 3 is placed in one end of the spool 21; the spindle portion 54 of the spindle 5 is placed in the other end of the spool 21; the spindle portion of the spindle 4 is placed in one end of the spool 22; and the spindle portion 64 of the spindle 6 is placed in the other end of the spool 22. At this time, as shown in FIG. 12, the projections 65 and 66 of the spindle 6 are 150 degrees apart from each other around the axis of the spindle portion 64. Also, as shown in FIG. 6, since the slots 26 and 27 in the other end face 22B of the spool 22 are arranged 150 degrees apart from each other around the center of the axis of the spool 22, the spindle portion 64 of the spindle 6 can be placed only in the other end of the spool 22. That is, when the spindle portion 64 of the spindle 6 is placed in one end or the other end of the spool 21 or in one end of the spool 22, the projection 65 comes into contact with the end face of the spool 21 or the spool 22 and can not be inserted any further beyond this position. In addition, when the spindle sections 35 and 54 of the spindle 3 to 5 are fitted in the other end of the spool 22, the projections 36 and 55 or the projections 37 and 56 contact the end face of the spool 22, and thereafter can not be inserted any further beyond this position. Consequently, the inserting position of the spindle 6 will be unequivocally determined. It is possible to identify the spindle 6 from among the four spindles 3 to 6 according to the angle of the projections 65 and 66, but this identification can be done more easily by using a different color for the spindle 6 from other spindles 3 to 5, for example.

Furthermore, when the ink ribbon 2 is mounted to the cover 7, the spindle 6 will be set on the other end of the second cylindrical section 72 because the round hole in the other end wall of the second cylindrical section 72 is smaller than the round hole in either end wall of the first cylindrical section 71 and the round hole in one end wall of the second cylindrical section 72 and therefore only the disk-shaped section 62 of the spindle 6 can be loosely placed in the round hole. That is, when the spindles 3 to 5 are positioned on the other side of the second cylindrical section 72, the round hole formed by the recesses 95 and 96 of the upper half section 86 and the lower half section 87 of the second cylindrical section 72 is smaller in diameter than the disk-shaped section 32 of the spindle 3 and the disk-shaped section 52 of the spindle 5, the lower half section 87 can not be engaged with the upper half section 86 and the cover 7 can not be closed accordingly. Consequently, with the ink ribbon 2 set in the cover 7, the other end of the spool 22 is positioned on the other end side of the second cylindrical section 72, and the ink ribbon 2 can be set in the proper mounting and winding directions, accordingly.

In the meantime, the spindles 3 to 5 can be placed in both ends of the spool 21 and in one end of the spool 22. If, however, the spindles 3 and 4 are inserted, for example, in the both ends of the spool 21, the spool 21 becomes longer by the width of the gear section 33 than the spool of which the spindles 3 and 5 are placed. Therefore, the lower half section 76 of the first cylindrical section 71 can not be engaged with the upper half section 75. That is, let us suppose that when the disk-shaped section of the spindle 4 is placed in the recess 84 in the other end wall of the upper half section 75 of the first cylindrical section 71, the collar section 34 of the spindle 3 is positioned between one end wall of the upper half section 75 and the partition wall 80. In this position, the rib 75A is provided on the upper half section 75 and the rib 76A is provided on the lower half section 76. Therefore, when the lower half section 76 is engaged with the upper half section 75, the inside diameter of the gear cover section comprising the one end wall of the upper half section 75 of the first cylindrical section 71, the partition wall 80, the rib 75A and the rib 76A is smaller than the diameter of the collar section 34 of the spindle 3. Therefore when the collar section 34 of the spindle 3 is disposed between one end wall of the upper half section 75 and the partition wall 80, the cover 7 can not be closed.

In addition, when the collar section 34 of the spindle 3 is held in contact with the partition wall 80 of the upper half section 75 of the first cylindrical section 71, the gear section of the spindle 4 is positioned in the recess 84 in the other end wall of the upper half section 75 of the first cylindrical section 71. The round hole formed by the recess 84 of the upper half section 75 and the recess 85 of the lower half section 76 is smaller in diameter than the gear section of the spindle 4 and therefore the lower half section 76 of the first cylindrical section 71 can not be engaged with the upper half section 75, and therefore the cover 7 can not be closed.

Furthermore, when the spindle 5 is fitted in one end of the spool 21 and then the spindle 3 in the other end of the spool 21, for example, the collar section 53 of the spindle 5 will be positioned in the gear cover section on one end of the first cylindrical section 71. Consequently, it becomes impossible to engage the lower half section 76 of the first cylindrical section 71 with the upper half section 75 and the cover 7 can not be closed.

If the spindles 3 to 6 are properly set in the spools 21 and 22 and the spools 21 and 22 thus assembled are not properly set in the cover 7, the cover 7 can not be closed. It is, therefore, possible to reliably prevent defective setting of the ink ribbon 2. The spindle 3 and the spindle 4, being of the same shape and size, may be mutually changed in position without causing any inconvenience.

While this invention has been described in conjunction with specific embodiments thereof, it is evident that many alternative, modifications, and variations will be apparent to those skilled in the art. Accordingly, preferred embodiments of the invention as set forth herein are intended to be illustrative, not limiting. Various changes may be made without departing from the spirit and scope of the invention as described in the following claims.

What is claimed is:

1. An ink ribbon cartridge, comprising:

an ink ribbon including a band-like sheet with a layer of ink formed on one surface thereof;

a pair of spools for holding the ink ribbon, each of the pair of spools having two ends, two end faces and a hole formed in each of the two ends, wherein two slots are formed in each end face of the pair of spools; and four spindles each having one end including a disk-shaped section, and an other end, wherein each of the other ends of the four spindles are seated in the holes formed in the ends of the pair of spools;

wherein the other end of a specific one of the four spindles can not be seated in the holes formed in the ends of three of four ends of the pair of spools, and the other ends of the other three of the four spindles can not be properly seated in the hole formed in the end of a specific one of four ends of the pair of spools.

2. The ink ribbon cartridge of claim 1, wherein each of the four spindles have two projections which fit in the two slots formed in each in each end face of the pair of spools.

3. The ink ribbon cartridge of claim 2, wherein the two projections provided on the specific one of the four spindles are arranged at a different angle from the other three spindles, with respect to an axial center of the specific spindle.

4. The ink ribbon cartridge of claim 3, wherein the two slots formed in a specific end face of one of the pair of spools are arranged at a different angle from the slots formed in the other end faces of the pair of spools with respect to a center of the end faces and the two projections provided on the specific one of the four spindles are so formed as to be fitted in the two slots formed in the specific end face of one of the pair of spools.

5. An ink ribbon cartridge, comprising:

an ink ribbon including a band-like sheet with a layer of ink formed on one surface thereof;

a pair of spools for holding the ink ribbon, each of the pair of spools having two ends, two end faces and a hole formed in each of the two ends; and four spindles each having one end including a disk-shaped section, and an other end, wherein each of the other ends of the four spindles are seated in the holes formed in the ends of the pair of spools;

wherein the other end of a specific one of the four spindles can not be properly seated in the holes formed in the ends of three of the four ends of the pair of spools, and the other ends of the other three of the four spindles can not be seated in the hole formed in the end of a specific one of the four ends of the pair of spools.

6. The ink ribbon cartridge of claim 5, wherein each end of the pair of spools has two slots, and each of the four spindles has two projections which fit in the two slots.

7. The ink ribbon cartridge of claim 6, wherein the two projections on the specific one of the four spindles are arranged at a different angle from the other three spindles, with respect to an axial center of the specific spindle.

8. The ink ribbon cartridge of claim 7, wherein the two slots formed in a specific end face of one of the pair of spools are arranged at a different angle from the slots formed in the other end faces of the pair of spools with respect to a center of the end faces and the two projections provided on the specific one of the four spindles are so formed as to be fitted in the two slots formed in the specific end face of one of the pair of spools.

9. A print cartridge, comprising:

a cartridge body having:

a first roll holding section having a first half section, a second half section pivotally connected along one longitudinal edge to the first half section by a connection section, a locking element on each end of the first roll holding section to lock the first half section to the second half section to close the first roll holding section, each half section having closed ends with an axially aligned recess, the recesses defining an axially aligned hole in each end of the first roll holding section when the first half section and the second half section are closed, the holes in both ends of the first roll holding section having the same diameter;

a second roll holding section having a first half section, a second half section pivotally connected along one longitudinal edge to the first half section by a connection section, a locking element on each end of the first roll holding section to lock the first half section to the second half section to close the second roll holding section, each half section having closed ends with an axially aligned recess, the recesses defining an axially aligned hole in each end of the second roll holding section when the first half section and the second half section are closed, the hole in a first end of the second roll holding section having a diameter equal to the diameter of the holes in the first end and second end of the first roll holding section and the hole in a second end of the second roll holding section having a different diameter;

a connection structure having a first connection member extending from the first end of the first half section of the first roll holding section to the first end of the first half section of the second roll holding section and a second connection member extending from the second end of the first half section of the first roll holding section to the second end of the first half section of the second roll holding section;

a plurality of spindles; and a ribbon assembly comprising:

a first spool;

a second spool; and an ink ribbon rolled on the first spool and attached to the second spool to be taken up thereon, the first spool comprising a first hollow tube, a first spindle of the plurality of spindles mounted to a first end of the first hollow tube and a second spindle of the plurality of spindles mounted to a second end of the first hollow tube; the second spool comprising a second hollow tube, a third spindle of the plurality of spindles mounted to a first end of the second hollow tube and a fourth spindle of the plurality of spindles mounted to a second end of the second hollow tube, the first and third spindles being identical and each having a spindle portion received in a respective first end of a one of the first hollow tube and the second hollow tube, a disk-shaped collar section, a gear section, a disk-shaped section and a small diameter portion away from the hollow tube, the second and fourth spindles having a spindle portion received in a second end of a respective one of the first hollow tube and the second hollow tube, a disk-shaped collar section, a disk-shaped section and a small diameter portion away from the hollow tube, the disk-shaped section of the fourth spindle having a different diameter than the disk-shaped section of the second spindle.

10. The print cartridge according to claim 9, wherein the cartridge body is one integral piece.

11. The print cartridge according to claim 9, wherein the diameter of the hole in the second end of the second roll holding section is less than the diameter of the holes in the first end of the second roll holding section and in both ends of the first roll holding section.

12. The print cartridge according to claim 11, wherein the diameter of the disk-shaped section of the fourth spindle is less than the diameter of the disk-shaped section of the second spindle.

13. The print cartridge according to claim 9, wherein the fourth spindle is distinguished by a different color than the first, second and third spindles.

14. The print cartridge according to claim 9, further comprising a partition wall in each of the first half section and the second half section of the both the first roll holding section and the second roll holding section interiorly separated from the closed first ends, the partition walls having axial recesses and connected to the closed first ends of the first roll holding section and the second roll holding section by ribs extending between the partition walls and the closed first ends.

15. An ink ribbon cartridge, comprising:

a cartridge body having a feed housing and a take-up housing, the feed housing and the take-up housing each having a first section and a second section pivotally joined by a connecting section, axial end walls of the first section and the second section each having a recess so that when the feed housing and the take-up housing are closed axially aligned holes are formed in each axial end wall, the first section and the second section further having a partition wall offset from and connected to an adjacent axial end wall at one end by ribs, a recess formed in the partition wall being larger than the recess formed in the axial end wall from which offset, the recesses in the partition walls of the first section and the second section when closed defining a gear hole;

locking members on an exterior surface of the axial end walls for locking the first section to the second section of each of the feed housing and the take-up housing;

a connecting member extending from each axial end of the first section of the take-up housing to a corresponding axial end of the first section of the feed housing;

a plurality of spindles comprising:

two gear spindles, each gear spindle having a spindle end, a collar, a gear, a disk-shaped section having a first size and a small diameter section in sequence, extending from the spindle portion and adjacent the collar are two projections offset from one another by 180°;

a feed spindle having a spindle portion, a collar, a disk-shaped section of the first size, and a small diameter portion, extending from the spindle portion and adjacent the collar are two projections offset from one another by 180°; and a take-up spindle having a spindle portion, a collar, a disk-shaped section having a second size, and a small diameter portion, extending from the spindle portion and adjacent the collar are two projections offset from one another at an angle different than 180°; and a ribbon assembly comprising:

a hollow feed spool having a pair of slots in each end, the slots off-set by 180°, and a hollow take-up spool having a pair of slots in each end, the slots at one end being off-set by 180°, the slots at the other end being off-set at the angle other than 180°, wherein a gear spindle is received in the one end of each of the feel spool and the take-up spool, the gear of each gear spindle being seated in the gear hole of a respective one of the feed housing and the take-up housing, the take-up spindle being received in the other end of the take-up spool with the disk-shaped section seated in the hole defined by the recesses in the first section and the second section of the take-up housing and the feed spindle seated in the other end of the feed spool with the disk-shaped section seated in the hole defined by the recesses in the first section and the second section of the feed housing.

*16. A print cartridge body, comprising:*

*a first roll holding section having a first half section,*

*a second half section pivotally connected along one longitudinal edge to the first half section by a connection section, a locking element on each end of the first roll holding section to lock the first half section to the second half section to close the first roll holding section, each half section having closed ends with an axially aligned recess, the recesses defining an axially aligned hole in each end of the first roll holding section when the first half section and the second half section are closed, the holes in both ends of the first roll holding section having the same diameter;*

*a second roll holding section having a first half section, a second half section pivotally connected along one longitudinal edge to the first half section by a connection section, a locking element on each end of the first roll holding section to lock the first half section to the second half section to close the second roll holding section, each half section having closed ends with an axially aligned recess, the recesses defining an axially aligned hole in each end of the second roll holding section when the first half section and the second half section are closed, the hole in a first end of the second roll holding section having a diameter equal to the diameter of the holes in the first end and second end of the first roll holding section and the hole in a second end of the second roll holding section having a different diameter; and*

*a connection structure having a first connection member extending from the first end of the first half section of the first roll holding section to the first end of the first*

*half section of the second roll holding section and a second connection member extending from the second end of the first half section of the first roll holding section to the second end of the first half section of the second roll holding section.*

*17. An ink ribbon cartridge body, comprising:*

*a feed housing and a take-up housing, the feed housing and the take-up housing each having a first section and a second section pivotally joined by a connecting section, axial end walls of the first section and the second section each having a recess so that when the feed housing and the take-up housing are closed axially aligned holes are formed in each axial end wall, the first section and the second section further having a partition wall offset from and connected to an adjacent axial end wall at one end by ribs, a recess formed in the partition wall being larger than the recess formed in the axial end wall from which offset, the recesses in the partition walls of the first section and the second section when closed defining a gear hole,*

*locking members on an exterior surface of the axial end walls for locking the first section to the second section of each of the feed housing and the take-up housing; and*

*a connecting member extending from each axial end of the first section of the take-up housing to a corresponding axial end of the first section of the feed housing, a size of the hole in the axial end of the feed housing adjacent the gear hole in the partition wall, and the hole in the axial end of the take-up housing adjacent the gear hole in the partition wall, the hole in the other axial end of the feed housing having substantially the same size, and a size of the hole in the axial end of the take-up housing being different than the three holes having substantially the same size.*

*18. An ink ribbon cartridge, comprising:*

*an ink ribbon including a band-like sheet with a layer of ink formed on one surface thereof;*

*a pair of spools for holding the ink ribbon, each of the pair of spools having two ends, two end faces, and a hole formed in each of the two ends;*

*four spindles each having one end including a disk-shaped section, and an other end, wherein each of the other ends of the four spindles are seated in the holes formed in the ends of the pair of spools; and*

*a cover covering the pair of spools and having four round holes in which the disk-shaped section of each of the four spindles is fitted, three round holes of the four round holes formed in the cover are of a first size and one round hole of the four round holes is of a second size.*

*19. The ink ribbon cartridge according to claim 18, wherein the one hole is formed in a portion of the cover receiving a take-up spool of the pair of spools.*

*20. The ink ribbon cartridge according to claim 18, wherein the cover comprises:*

*a take-up portion;*

*a supply portion; and*

*connection members extending from axial ends between the take-up portion and the supply portion, a round hole in each axial end of each of the take-up portion and the supply portion, the one round hole being formed in one axial end of the take-up portion.*

*21. An ink ribbon cartridge, comprising:*

*an ink ribbon including a band-like sheet with a layer of ink formed on one surface thereof;*

*a pair of spools for holding the ink ribbon, each of the pair of spools having two ends, two end faces and a hole formed in each of the two ends;*

*four spindles each having one end including a disk-shaped section, and an other end, wherein each of the other ends of the four spindles are seated in the holes formed in the ends of the pair of spools; and*

*a cover covering the pair of spools and having four round holes in which the disk-shaped sections of the four spindles are fitted, wherein three of the four round holes formed in the cover are formed to have substantially the same size, one of the four round holes formed in the cover is formed to have a smaller size.*

*22. An ink ribbon cartridge, comprising:*

*an ink ribbon including a band-like sheet with a layer of ink formed on one surface thereof;*

*a pair of spools for holding the ink ribbon, each of the pair of spools having two ends, two end faces and a hole formed in each of the two ends;*

*four spindles each having one end including a disk-shaped section, and an other end, wherein each of the other ends of the four spindles are seated in the holes formed in the ends of the pair of spools; and*

*a cover covering the pair of spools and having four round holes in which the disk-shaped section of the four spindles are fitted, wherein the other end of three of the four spindles cannot be properly seated in the hole formed in one of the four ends of the pair of spools, and a specific one of the four round holes formed in the cover is smaller than the other three of the four round holes formed in the cover.*

*23. An ink ribbon cartridge, comprising:*

*an ink ribbon including a band-like sheet with a layer of ink formed on one surface thereof;*

*a pair of spools for holding the ink ribbon, each of the pair of spools having two ends, two end faces and a hole formed in each of the two ends, wherein two slots are formed in each end face of the pair of spools;*

*four spindles each having one end including a disk-shaped section, and an other end, wherein each of the other ends of the four spindles are seated in the holes formed in the ends of the pair of spools and the other end of three of the four spindles can not be properly seated in the holes formed in the end of one of the four ends of the pair of spools; and*

*a cover covering the pair of spools and having four round holes in which the disk-shaped section of each of the four spindles is fitted, wherein one of the four round holes formed in the cover is formed smaller than the other three of the four round holes.*

*24. An ink ribbon detachably installed in an ink ribbon cartridge, comprising:*

*a band-like ink ribbon sheet with a layer of ink formed on one surface thereof;*

*a pair of spools for holding the ink ribbon sheet, each of the pair of spools having two ends, two end faces, and a hole formed in each of the two ends, wherein only two slots are formed in each end face of the pair of spools and the two slots formed in a specific end face of one of the pair of spools are arranged at a different angle from the slots formed in the other end faces of the pair of spools with respect to a center of the end faces; and*

*four spindles each having one end including a disk-shaped section, and an other end, wherein the ends of three of the four spindles have two projections that can*

*be seated in the two slots of the end faces of the pair of the spools except the specific end face.*

*25. An ink ribbon cartridge detachably installed in a printing device, comprising:*

*an ink ribbon including a band-like sheet with a layer of ink formed on one surface thereof;*

*a pair of spools for holding the ink ribbon, each of the pair of spools having two ends, two end faces, and a hole formed in each of the two ends;*

*four spindles each having one end including a disk-shaped section, and an other end, wherein two of the four spindles each have a gear section formed to rotate the spools on the four spindles, the two spindles having the gear section being provided on the same side of the end faces of the pair of spools, and the gear sections of the two spindles each having a same diameter and a same gear ratio, wherein the gear sections of the two spindles are engagable with two gears provided in the printing device to rotate each spool when the ink ribbon cartridge is installed in the printing device; and*

*a cover covering the pair of spools and having four round holes in which the disk-shaped section of the four spindles are fitted, wherein the other end of three of the four spindles cannot be properly seated in the hole formed in one of the four ends of the pair of spools, and a specific one of the four round holes formed in the cover is smaller than the other three of the four round holes formed in the cover.*

* * * * *

UNITED STATES PATENT AND TRADEMARK OFFICE

CERTIFICATE OF CORRECTION

PATENT NO. : RE 39,169 E
APPLICATION NO. : 10/323062
DATED : July 11, 2006
INVENTOR(S) : Yoshikatsu Kameyama It is certified that error appears in the above-identified patent and that said Letters Patent is hereby corrected as shown below:

Title page, item Notice: should read
Notice: More than one reissue application has been filed for the reissue of patent 6,161,972. The reissue applications are: Application No. 10/323062 and Application No. 11/342231, with Application No. 11/342231 being a continuation of Application No. 10/323062.

Signed and Sealed this

Third Day of March, 2009

John Doll

JOHN DOLL
*Acting Director of the United States Patent and Trademark Office*

UNITED STATES PATENT AND TRADEMARK OFFICE

CERTIFICATE OF CORRECTION

PATENT NO. : RE 39,169 E
APPLICATION NO. : 10/323062
DATED : July 11, 2006
INVENTOR(S) : Yoshikatsu Kameyama It is certified that error appears in the above-identified patent and that said Letters Patent is hereby corrected as shown below:

Column 1, line 8, insert:
--Notice: More than one reissue application has been filed for the reissue of patent 6,161,972. The reissue applications are: Application No. 10/323062 and Application No. 11/342231, with Application No. 11/342231 being a continuation of Application No. 10/323062.--

This certificate supersedes the Certificate of Correction issued March 3, 2009.

Signed and Sealed this

Thirty-first Day of March, 2009

John Doll

JOHN DOLL
*Acting Director of the United States Patent and Trademark Office*